Sept. 15, 1970             E. J. BRAYLEY                  3,529,211
GENERATOR PROTECTIVE DEVICE USING A ZENER DIODE AS
AN OVERVOLTAGE SENSOR
Filed May 1, 1967

INVENTOR.
ELWIN J. BRAYLEY
BY PENDLETON, NEUMAN
SEIBOLD & WILLIAMS

ATTORNEYS

United States Patent Office 3,529,211
Patented Sept. 15, 1970

3,529,211
GENERATOR PROTECTIVE DEVICE USING A ZENER DIODE AS AN OVERVOLTAGE SENSOR
Elwin John Brayley, East Longmeadow, Mass., assignor, by mesne assignments, to Eltra Corporation, Toledo, Ohio, a corporation of New York
Filed May 1, 1967, Ser. No. 635,045
Int. Cl. H02h 1/04, 3/20, 7/14
U.S. Cl. 317—31    4 Claims

ABSTRACT OF THE DISCLOSURE

A voltage sensing protection circuit which uses a Zener diode and a silicon control rectifier to open the normally closed contacts in the field circuit of a voltage regulated battery supply system.

BACKGROUND

Field of the invention

This invention relates primarily to voltage sensing protection circuits and particularly to a protection circuit used in conjunction with a battery charging system.

Brief description of the prior art

Battery charging systems as used for example in automobiles and aircraft generally include, in addition to a battery, a charging device such as an alternator, and a voltage regulator. The voltage regulator is frequently a semiconductor circuit. In many charging systems, it is possible for the regulator to fail so that the voltage output of the charging device will rise to a level where the auxiliary equipment, e.g., a radio, will be damaged. It is especially important to prevent this type of failure in aircraft or other equipment where the auxiliary equipment must be dependable.

SUMMARY OF THE INVENTION

The present invention provides a voltage sensing device which opens a circuit in response to the voltage sensed in order to prevent a dangerous condition from occurring. In one embodiment, the circuit which is opened by the protection device is the field supply of an alternator which supplies current to charge the battery. The voltage sensing, in a preferred embodiment, is accomplished by breaking down a Zener diode, or equivalent device, when the overvoltage condition is reached. The Zener diode is coupled to a semiconductor device such as an SCR (silicon control rectifier) which is driven to a conducting state upon breakdown. The current through the SCR actuates a switching device such as a relay which opens the desired circuit.

A filter circuit is built into the protection circuit to prevent transient spikes from triggering the circuit.

Also, a switch may be provided in the field supply line to enable recycling the operation of the protection circuit.

DESCRIPTION OF THE PREFERRED EMBODIMENT

Figure 1:
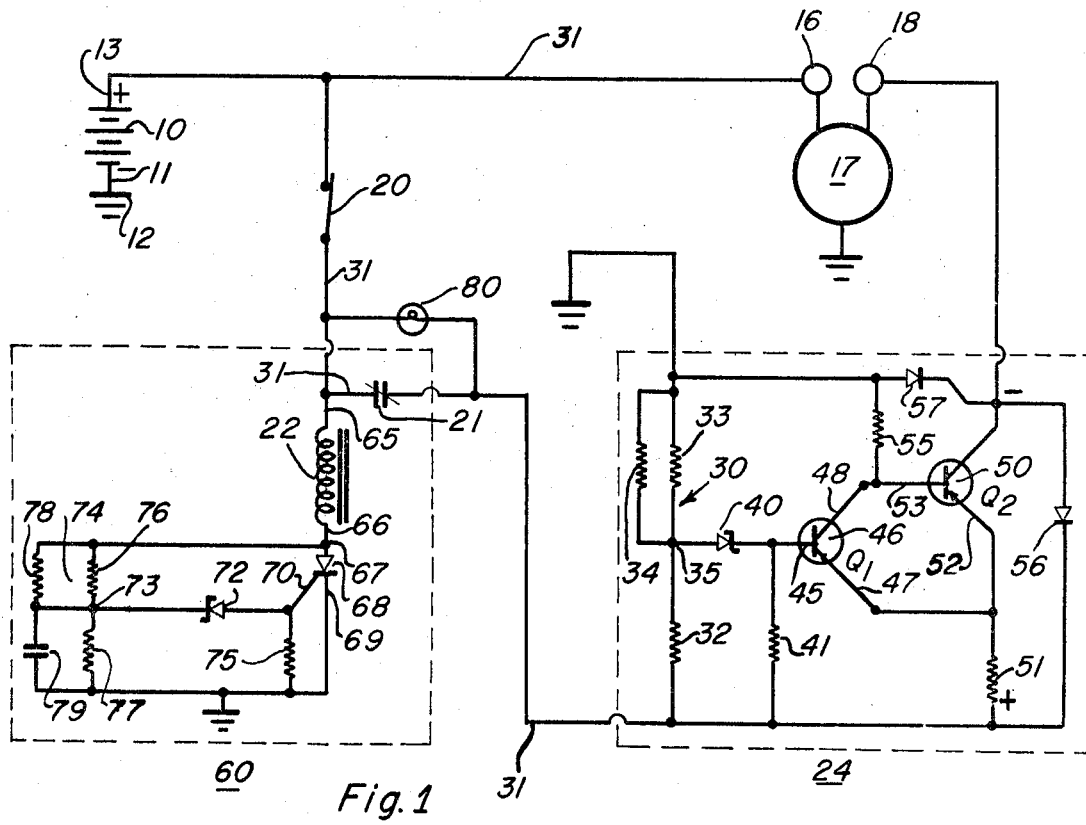
FIG. 1 of the drawing is a schematic diagram of a circuit incorporating the present invention.

The circuit illustrated in FIG. 1 is a battery-alternator supply circuit which might be used, for example, in an automobile or aircraft to supply power for the electrical equipment. For purposes of discussion, it will be assumed that this is a 12-volt system; however, it should be understood that the invention is in no sense limited to such usage. The battery 10 has its negative terminal 11 connected to a point of reference potential or ground 12 and its positive terminal 13 connected through a conductor 14 to the armature terminal 16 of an alternator 17. A rectifier (not shown) is connected in the conventional manner between the armature terminal 16 and the actual armature winding. The alternator is also grounded. The second terminal 18 of the alternator 17 is the ungrounded end of its field winding. In the illustrated embodiment, the voltage supplied by the alternator 17 is controlled by controlling the current through the field. Thus, current is supplied to the field terminal 18 through a normally closed switch 20, the normally closed contacts 21 of a relay 22, and a transistor 50 of a conventional semiconductor voltage regulator 24.

The regulator 24 includes a voltage divider 30 connected between the positive line 31 and ground. The voltage divided 30 includes two resistors 32, 33 with the second resistor 33 parallel by a third resistor 34 which is used to accurately set the ratio of the divider 30. A Zener diode 40 is connected between the mid-point 35 of the voltage divider 30 and one end of a fourth resistor 41, which has its other end connected to the positive line 31. The Zener diode 40 is connected to the base 45 of a PNP transistor 46 having its emitter-collector path positioned across the emitter-base circuit of a second PNP transistor 50. A very small bias resistor 51 is connected between the positive line 31 and the emitters 47, 52 of both transistors 46, 50. A much larger resistor 55 is connected between ground and both the base 53 of the second transistor 50 and the collector 48 of the transistor 46. Two diodes 56, 57 are connected in the circuit to prevent the second transistor 50 from burning out under adverse conditions. Typical values for the various elements shown in the regulator are as follows:

Resistors: R32—120 ohms; R33—150 ohms; R34—2000 ohms (nominal); R41—27 ohms; R51—.02 ohm; R55—68 ohms.

Transistors: First 46, 2N1038; second 50, 2N456.

Both diodes 56, 57 may be 1-watt diodes with a minimum peak inverse voltage of 50 volts. Typically, the Zener diode 40 will have a breakdown voltage of 6.4 volts.

As mentioned above, the voltage generated by the alternator 17 is controlled by regulating the field current through the second transistor 50 of the regulator 24 which operates in a cyclical on-off fashion. In the on condition, current flows from the positive line 31 through the bias resistor 51 and the emitter-base circuit of the second transistor 50 so that this transistor 50 is conducting. Therefore, full current is supplied to the field windings of the alternator 17 through the emitter-collector path of the transistor 50. The first transistor 46 is cut off during this time. When the voltage generated by the alternator 17 increases, the voltage at the mid-point 35 of the voltage divider 30 also increases. However, the mid-point voltage does not increase as fast as the voltage at the base 45 of the first transistor 46. Eventually the potential difference between the mid-point 35 and the base 45 is sufficient to break down the Zener diode 40. When the Zener diode 40 breaks down, the voltage at the base 45 drops and the first transistor 46 is turned on thereby short circuiting the emitter-base circuit of the second transistor 50. The second transistor 50 is then cut off. With the regulator in this condition, the supply of current to the field windings of the alternator ceases, and the voltage level at its output 16 decreases. As the voltage generated by the alternator 17 decreases, eventually the Zener diode 40 stops conducting, the second transistor 50 is turned on, and field current is once again supplied to the alternator 17.

The use of a controlled transistor 50 to supply current to the field windings of the alternator generally ensures trouble-free operation. However, it is possible that the current controlling transistor 50 may become short-circuited for one reason or another. Should this condition occur, the voltage generated by the alternator 17 may increase to a level which may be dangerous for the equipment which is being supplied power. To prevent this dangerous condition, the present invention employs a protection circuit 60.

In the illustrated embodiment of the protection circuit 60, the pair of normally closed contacts 21 are positioned in the field supply line 31 which supplies current through the regulator 24 to the alternator field terminal 18. The contacts 21 are controlled by the relay coil 22 which has a first end 65 connected to the positive line 31 and a second end 66 connected to the anode 67 of a SCR 68. A second terminal the cathode 69 of the SCR 68 is connected to ground. The gate 70 of the SCR 68 is connected through a zener diode 72 to the mid-point 73 of a voltage divider 74 and through a resistor 75 to ground. One resistor 76 of the voltage divider 74 is connected to the anode 67 of the SCR 68 and the second resistor 77 is connected to ground. A third resistor 78 parallels the first resistor 76 and is used to accurately set the operating point of the protection circuit 60. A capacitor 79, which parallels the second resistor 77, forms a filter circuit with the coil 22 to prevent transient spikes from triggering the protection circuit.

Typical values for the components used in the protection circuit may be as follows:

Relay 22: 2400 turns of No. 31 wire
SCR: General Electric No. C106Y2
Resistors: R75—1000 ohms; R76, R77—6200 ohms; R78—20,000 ohms (nominal)
Capacitor: 50 microfarads, 15 volts The Zener diode 72 may, for example, have a 12-volt breakdown voltage.

Under normal conditions the switch 20 in the positive line 31 is closed as are the contacts 21 in the protection circuit 60. For the purpose of description, assume that the second transistor 50 of the voltage regulator 24 becomes short-circuited so that the voltage generated by the alternator 17 increases. When the voltage on the positive line 31 becomes too high, the protection circuit opens the contacts 21 of the relay 22 to shut off the flow of current to the alternator 17.

The protection circuit operates as follows. The voltage at the mid-point 73 of the voltage divider 74 is proportional to the field voltage and increases as the field voltage increases due to the failure of the regulator 24. Eventually the voltage increases to a point sufficient to break down the zener diode 72. When this condition occurs the SCR 68 is turned on and sufficient current flows through the relay 22 to open the normally closed contacts 21.

Figure 2:
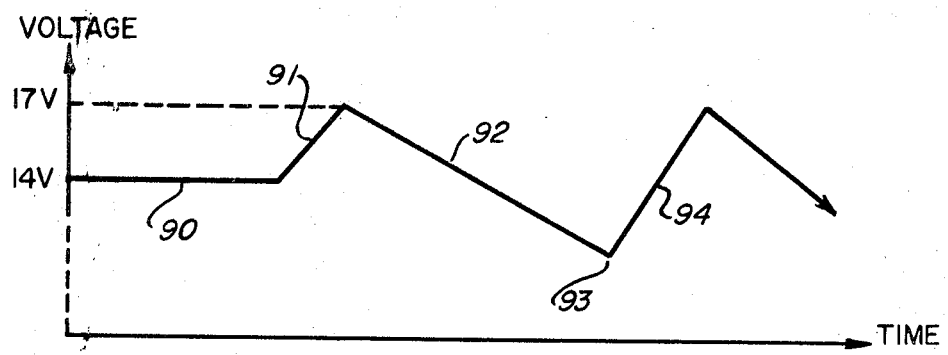
FIG. 2 is a voltage versus time diagram illustrating the operation of the circuit shown in FIG. 1.

The illustrated circuit indicates the regulator failure by an indicator lamp 80 which lights to indicate the open condition of the contacts 21 in the protection circuit. Once this lamp indicates the overvoltage condition, the operator may open the main field switch 20. The main field switch 20 may remain open until the system voltage reaches a desired level, at which time the switch 20 may again be closed so that the armature voltage will build up to the level at which the protection circuit 60 will operate once again to open the contacts 21. This type of operation is illustrated in the voltage versus time diagram of FIG. 2. The first portion 90 of the diagram illustrates the normal operating condition where the alternator is operating at approximately 14 volts. The next portion 91 of the curve indicates the rise in voltage which occurs after the control transistor 50 becomes shortcircuited. The slope of this portion is determined by the load and alternator characteristics. When the alternator voltage reaches the set point of the protection circuit (e.g. 17 volts), the field circuit is opened, the indicator lamp 80 lights, and the operator opens the main field switch 20. The alternator voltage decreases 92 as illustrated to a point 93 at which the operator closes the main field switch 20. The alternator voltage then rises to the set-point of the protection circuit. This operation continues until the faulty condition of the regulator is remedied.

In the illustrated embodiment, the main field switch 20 is operated by hand in response to the visual indication of the indicator lamp 80. It may be desirable, in some applications, to provide an automatic operation of the main field switch 20.

While the invention has been described with respect to a certain preferred embodiment, it is in no sense limited thereto. The invention is defined in the follownig claims.

What is claimed is:

1. In a power supply circuit including a generating device having a field, and a voltage regulator in a control circuit for the field of the generator device, said regulator controlling the level of the normal voltage generated by the generating device; a protection circuit in the power supply circuit for preventing excessive voltage levels above the normal voltage in the event of failure of the voltage regulator comprising: means cooperating with the voltage regulator including a voltage divider and a Zener diode for sensing the voltage level generated by the generating device, and means responsive to the sensing means including a silicon controlled rectifier for opening the control circuit when the sensed voltage exceeds by a predetermnied level the normal voltage.

2. The circuit of claim 1 wherein the means responsive to the sensing means includes a relay.

3. In a battery supply system including a battery and generating means including a field winding and an armature coupled to the battery, the combination comprising: voltage regulation means coupled between the armature and the field winding, a first manually-operable switch in series with said voltage regulation means, a normally closed, current responsive switch in series with said first switch and said voltage regulation means, means including a Zener diode and a voltage divider responsive to the voltage at said armature for opening said current responsive switch when the voltage at said armature exceeds a predetermined value above the normal operating range of the voltage regulating means.

4. The combination of claim 3 further including a lamp in parallel with the normally closed contacts of said current responsive switch.

References Cited

UNITED STATES PATENTS

| | | | |
|---|---|---|---|
| 3,119,951 | 1/1964 | Davy | 317—49 X |
| 3,173,077 | 3/1965 | Kirk et al. | 322—28 X |
| 3,213,323 | 10/1965 | Circle | 317—50 X |
| 3,383,563 | 5/1968 | Wright | 317—33 X |
| 3,335,325 | 8/1967 | Elpers | 317—33 X |

FOREIGN PATENTS 588,204  11/1933  Germany.

JAMES D. TRAMMELL, Primary Examiner

U.S. Cl. X.R.

317—33, 49; 320—64; 322—28, 73